US007250189B2

(12) United States Patent
Ji et al.

(10) Patent No.: US 7,250,189 B2
(45) Date of Patent: Jul. 31, 2007

(54) INCREASING THE HYDROPHILICITY OF CARBON FIBER PAPER BY ELECTROPOLYMERIZATION

(75) Inventors: Chunxin Ji, Rochester, NY (US); Gerald W Fly, Geneseo, NY (US)

(73) Assignee: General Motors Corporation, Detroit, MI (US)

( * ) Notice: Subject to any disclaimer, the term of this patent is extended or adjusted under 35 U.S.C. 154(b) by 251 days.

(21) Appl. No.: 10/912,396

(22) Filed: Aug. 5, 2004

(65) Prior Publication Data

US 2006/0029855 A1 Feb. 9, 2006

(51) Int. Cl.
*B05D 5/12* (2006.01)

(52) U.S. Cl. .................. 427/115; 521/27; 205/317; 205/50; 205/414

(58) Field of Classification Search ............... 427/115; 521/27; 205/317, 50, 414
See application file for complete search history.

(56) References Cited

U.S. PATENT DOCUMENTS

| 4,038,463 A | 7/1977 | Lamarine et al. |
| 4,931,168 A | 6/1990 | Watanabe et al. |
| 5,346,780 A * | 9/1994 | Suzuki ................. 429/42 |
| 5,998,058 A | 12/1999 | Fredley |
| 6,083,638 A | 7/2000 | Taniguchi et al. |
| 6,365,293 B1 | 4/2002 | Isono et al. |
| 2002/0175073 A1* | 11/2002 | Nakamura et al. .......... 204/294 |
| 2003/0068550 A1* | 4/2003 | Naoi et al. ................. 429/213 |
| 2003/0113611 A1* | 6/2003 | Abe et al. ................... 429/43 |
| 2003/0143453 A1* | 7/2003 | Ren et al. ................... 429/40 |
| 2003/0194557 A1* | 10/2003 | Wilde et al. ............... 428/408 |
| 2006/0029858 A1* | 2/2006 | Ji ............................. 429/42 |

FOREIGN PATENT DOCUMENTS

EP    0 846 347    8/1996

OTHER PUBLICATIONS

"Control of carbon fiber—polypyrrole interphases by aqueous electrochemical process", Jude O. Iroh et al., Composites Part B 29B, Elsevier Science Limited, Great Britain, 1998, pp. 181-188.

* cited by examiner

*Primary Examiner*—Bruce F. Bell
(74) *Attorney, Agent, or Firm*—Harness, Dickey & Pierce, P.L.C.

(57) ABSTRACT

An electroconductive porous substrate such as carbon fiber paper with an electroconductive polymer deposited on the carbon fibers of the paper is used as a wicking material or diffusion medium in a fuel cell. The polymer may be deposited from a solution of monomers by electrochemical polymerization.

13 Claims, No Drawings

INCREASING THE HYDROPHILICITY OF CARBON FIBER PAPER BY ELECTROPOLYMERIZATION

FIELD OF THE INVENTION

The invention relates to the electrodeposition of conductive polymers onto porous electroconductive substrates. In particular, this invention relates to the preparation of hydrophilic carbon fiber paper for use in water management in fuel cells.

BACKGROUND OF THE INVENTION

Fuel cells have been proposed as a power source for electric vehicles and other applications. An exemplary fuel cell has a membrane electrode assembly (MEA) with catalytic electrodes and a proton exchange membrane (PEM) sandwiched between the electrodes. Diffusion media made of porous conductive material may be used on the cathode and anode side to improve cell operation.

Water management is an important concern in operation of fuel cells. For example, water is generated at the cathode electrode based on the electrochemical reactions between hydrogen and oxygen occurring within the MEA. Water is needed for and is depleted by transport of protons from the anode through the PEM to combine with oxidant at the cathode. In addition, the proton conductivity of the PEM is heavily dependent on its state of hydration. For these and other reasons, efficient operation of a fuel cell depends on the ability to provide effective water management in the system, for example to control transport of water away from generation sites on the cathode to prevent flooding, and to cool the fuel cell to prevent overheating.

In part to improve water management, diffusion media have been introduced between the electrodes and impermeable members such as a bipolar plate that separate cells within a stack. Carbon fiber paper is useful in these applications, as it is conductive and can maintain electrical connections in the cell.

Optimum water management calls for a balance of hydrophilic and hydrophobic properties in fuel cell components such as carbon fiber paper diffusion media. Because carbon paper has a relatively low surface energy, and is not readily wetted by water, it would be desirable to provide a method for increasing the hydrophilicity of such material so that it could be adapted for providing better water management and cooling in fuel cells.

SUMMARY OF THE INVENTION

The present invention provides methods for increasing the hydrophilicity of carbon fiber paper by electrodepositing an electroconductive polymer onto the paper. The product of the method is a carbon fiber paper with the electroconductive polymer deposited on the carbon fibers of the paper, for example as a thin film. The polymer may be deposited from a solution of monomers by electrochemical polymerization.

A fuel cell is also provided containing the polymer-coated hydrophilic carbon paper as a wicking material or diffusion medium. The fuel cell contains an anode, a cathode, and a proton exchange membrane disposed between anode and cathode. Wicking material is disposed in a fluid distribution chamber adjacent the cathode, the anode, or both.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

The following description of the preferred embodiment(s) is merely exemplary in nature and is in no way intended to limit the invention, its application, or uses.

In one embodiment, a hydrophilic material is provided that is made of an electroconductive porous substrate and an electroconductive polymer deposited on the substrate. The electroconductive polymer may be deposited on the paper from a solution of monomers by a process of electrochemical polymerization or electropolymerization.

In various embodiments, the hydrophilic material is used as a diffusion medium in a PEM fuel. The diffusion medium comprises an electroconductive porous substrate such as a carbon fiber paper and an electroconductive polymer deposited or coated on the substrate.

Advantageously, the electrocoated porous substrate exhibits a surface free energy greater than that of an untreated carbon fiber paper. Untreated carbon fiber paper generally has a surface free energy of about 50 dyne/cm. In a preferred embodiment, the coated substrate of the invention has a surface free energy greater than 50 dyne/cm, preferably greater than 60 dyne/cm. In other embodiments, porous media useful as wicking material or diffusion media in fuel cells is provided having a surface tension of greater than 70 dyne/cm, and in other embodiments greater than 80 dyne/cm. In various embodiments, the surface tension is greater than 72 dyne/cm. The surface free energy depends in part on the extent of coating or deposition by the electroconductive polymer, as discussed further below.

Carbon fiber paper is well-known in the art and is commercially available, for example from Toray Carbon Fibers. The paper takes the form of a non-woven fabric made of carbon fibers, and may be made in a variety of densities and thicknesses. In various embodiments, the density of the paper is from about 0.4 $g/cm^3$ to about 0.6 $g/cm^3$, the thickness of the paper is from about 100 to about 1000 micrometers, and the porosity is from about 70% to about 80%.

In various embodiments, the hydrophilic material is made by a process of electrochemical polymerization. In the process of the invention, an electroconductive porous medium such as a carbon fiber paper is used as the working electrode of an electrochemical cell. The carbon fiber paper anode is immersed in a solution of monomers and electrolyte. A positive potential is applied to the working electrode, and the conductive polymer is formed by anode coupling of monomer radical cations (for example, pyrrole radical cations to form polypyrrole at the 2,5 position). The formation of the conductive polymer and surface properties of the coating are dependent on the monomer concentration, electrolyte concentration, and the reaction conditions.

Suitable monomers include those known to form electroconductive polymers upon polymerization at an anode having a voltage above the oxidation potential of the monomer. Non-limiting examples of such monomers include pyrrole, thiophene, aniline, furan, azulene, carbazole, as well as substituted derivatives of these. Substituted derivatives include 1-methylpyrrole, and various β-substituted pyrroles, thiophenes, and furans. Non-limiting examples of β-substituted thiophenes include, for example, β-alkyl thiophene, β-bromo thiophene, β-$CH_2CN$ thiophene, and β,β'-dibromothiophene. Similar substitutions may be provided on a furan or pyrrole ring. Furthermore, various alkyl, halo, and other substituted azulenes and carbazoles may be used. As noted above, the carbon fiber paper is set up as the working electrode, or anode, during the electropolymerization. Suitable counter-electrodes are also provided and a standard calomel reference electrode (SCE) may be placed close to the working electrode. The carbon fiber paper may be electrically coupled to a current collector such as a metal foil, or may be connected directly into the circuit by suitable clips, leads, or other devices. The counter-electrodes and the working electrodes are generally immersed in the same electrolyte. The compartment in which the anode is held further contains a suitable concentration of polymerizable monomers.

In general, the concentration of the polymerizable monomers may be chosen over a wide range depending on the conditions of polymerization. It is to be understood that the rate of polymerization and the extent of incorporation of the polymer onto the carbon fiber surface will be determined in part by the concentration of the monomer. Suitable monomeric concentrations include concentrations between about 0.01M and the upper solubility limit of the monomer. In various embodiments, a maximum concentration of about 1.5 M of the polymerizable monomer is used. In various other embodiments, the monomer concentration is at least about 0.1 M, or is in the range of about 0.5 M to about 1.5 M.

The electropolymerization compartments also contain a suitable level of electrolyte. A wide variety of electrolytes may be used, and the concentration of the electrolyte is chosen depending on the other characteristics of the electrochemical cell and the other reaction conditions. Preferably, the electrolyte concentration is chosen so that charge transfer through the cell by means of the electrolyte molecules is not rate limiting. As with the monomers, the concentration of the electrolyte may range from about 0.01 M up to its solubility limit in the solvent. Preferably electrolytes are used in a range between about 0.01 M and about 1.5 M, preferably from about 0.1 M to about 1.0 M. A preferred solvent is water.

The electrolyte may be chosen from molecules or mixtures of molecules that contain a molecular charge and can carry electrons through the solution between the electrodes. Commonly used electrolytes include sulfonic acids and sulfonates such as, without limitation, camphor sulfonic acid, para-toluene sulfonic acid, dodecyl benzene sulfonic acid, sulfuric acid, alizarin red S-monohydrate, and their salts, especially the sodium salts. The structure and concentration of the electrolyte will affect the surface free energy of the coated carbon fibers.

The electroconductive polymer is deposited onto the anode carbon fiber paper by passing current through the polymerization compartment for a time to oxidize a sufficient amount of monomer to react to form the electroconductive polymer on the carbon fiber surface. The reaction time for deposition of the polymer will depend on many factors, such as the temperature of the cell, the concentration of monomer and electrolyte, the configuration of the cell, and the desired extent of incorporation of polymer onto the carbon fiber paper. Typical reaction times range from a few seconds to tens of minutes. In various embodiments, a relatively low deposition current is preferred to achieve a low polymerization rate and a homogeneous coating. It is usually preferred to provide reaction parameters such that the reaction time is suitably short for economic operation of the process, consistent with the formation of a homogeneous conductive polymer coating on the fibers. In a preferred embodiment, cell parameters and reaction conditions are chosen to provide for a reaction time from about 0.5 minutes up to about 30 minutes, preferably about 1 minute up to 10 minutes. By varying the parameters just as discussed, coated carbon fiber papers having a surface free energy from just above that of uncoated carbon fibers to more than 80 dyne/cm may be prepared.

Electropolymerization is carried out with the anode held at voltage above the oxidation potential of the polymerizable monomer. Above that voltage, an applied voltage may be chosen consistent with the reaction time, surface free energy, monomer concentration, electrolyte concentration, reaction temperature and other parameters. As a practical matter, the applied voltage should be less than the voltage that would hydrolyze the water in the electrochemical cell. In various embodiments, the applied voltage is in the range from about 0.5 to about 2.5 volts. Various counter electrodes may be used, such as platinum mesh, titanium mesh, and graphite blocks.

In a preferred embodiment, the electropolymerization is carried out by using a pulse deposition technique. For example, by setting a potentiostat to deliver a pulse voltage (square wave function at a certain frequency), build up of polymer and clogging of the pores in the carbon fiber paper can be minimized or avoided. During the cycle when the voltage is applied, the monomer is oxidized at the surface of the anode and deposits as an electroconductive polymer on the surface. At the same time, the volume of electrolyte around the surface is temporarily depleted of monomer. When the voltage cycle is off, reaction stops, and the concentration of monomer can become re-established at the surface of the anode by diffusion from the bulk of the anode cell electrolyte. When the voltage is again turned on, the monomer is oxidized at the anode surface and electroconductive polymer is deposited as before. The duration of the voltage or current pulses may be chosen to optimize the rate and uniformity of the formation of the electroconductive polymers on the surface. For example, the frequency of pulses may be selected from about 0.1 Hz to about 0.001 Hz. The percent on/off time during a cycle may also vary. In a typical embodiment, the on/off cycle time is 50/50.

The surface free energy and other useful physical characteristics of the coated carbon fiber paper depend on the amount of polymer that is electropolymerized onto the surface. In various embodiments, a wicking material comprises a carbon fiber paper coated with from about 5% to about 30% by weight of an electroconductive polymer, or from about 5% to about 15% by weight. In a preferred embodiment, the thickness of the polymer coating is about 5% to about 10% of the diameter of the carbon fibers.

In a process for making the coated carbon fiber paper of the invention, preferred monomers for the electropolymerization include pyrrole and aniline. In this embodiment, a polypyrrole or polyaniline thin film is deposited onto the surface of the carbon fibers in the carbon fiber paper. Generally a small amount of electrolyte is also incorporated into the electrodeposited conductive polymer, which can be used to tailor the conductivity and surface free energy of the polymer coating.

Wicking material made by the above-described process is more hydrophilic than uncoated carbon fiber paper, and functions to absorb or wick water at an increased rate.

In another embodiment, wicking material described above is used as a diffusion medium in an electrochemical fuel cell to provide integrated water management. Such water management functions include: moving water away from wet areas such as the cathode side of the fuel cell, where it is generated as a product in the fuel cell electrochemical reaction; transporting water internally to any relatively dry areas along the cathode side; providing cooling for the fuel cell; and humidifying the proton exchange membrane (PEM) of the membrane electrode assembly (MEA). The wicking material preferably transports liquid by wicking (i.e. capillary action) alone, and does not require external pumping for such liquid transport.

In various preferred embodiments, diffusion media of the invention are used in fuel cells. Exemplary fuel cells comprise an anode, a cathode, and a proton exchange membrane (PEM) disposed between the anode and the cathode. Impermeable electrically conductive members are provided adjacent the cathode and anode, and together with the respective electrodes define fluid distribution chambers associated with the cathode and anode, respectively. A diffusion medium such as described above is disposed in one or both of the fluid distribution chambers.

Individual proton exchange membrane (PEM) fuel cells according to one preferred embodiment of the present invention are usually connected to form a fuel cell stack. Each PEM fuel cell has a membrane-electrode-assembly (MEA), and the cells are separated from one another by electrically conductive, impermeable separator plates. The MEA contains an anode, a cathode, and a proton exchange membrane disposed between the anode and cathode. In a multiple fuel cell stack, a preferred bipolar separator plate typically has two electrically active sides, each active side respectively facing a separate MEA, i.e. adjacent the cathode of one MEA and the anode of the other. As described herein, the fuel cell stack has conductive bipolar separator plates in a stack with multiple fuel cells, however the present invention is equally applicable to conductive separator plates within a stack having only a single fuel cell. Gas-permeable conductive diffusion media press up against the electrode faces of the MEAs. When the fuel cell stack is assembled, the conductive gas diffusion layers assist in even distribution of gas across the electrodes of the MEAs and also assist in conducting electrical current throughout the stack, in addition to their water management functions described above.

During operation, oxygen is supplied to the cathode side of each fuel cell in the stack, while hydrogen is supplied to the anode side. Alternatively, air may be supplied to the cathode side from the ambient, and hydrogen to the anode from a methanol or gasoline reformer, or the like.

EXAMPLE

Polyaniline can be coated on carbon fiber paper (Toray TGP H060: about 180 μm thick, 7 μm fiber diameter and 75% porosity) in camphor sulfonic acid electrolyte. The solution contains 0.5 M aniline and 0.1 M camphor sulfonic acid in water. A piece of 3"×3" Toray H060 carbon fiber paper was placed in the middle of the plating bath as working electrode. Two pieces of graphite blocks are placed on each side of the carbon fiber paper, which are about 1.5" apart from the carbon paper surface. An SCE electrode is placed near the carbon paper surface as reference electrode.

The electropolymerization process is performed with a Potentiostat using either of the following methods: 1) a constant potential of 0.8 V is applied until the desired loading is achieved; 2) a square wave of applied voltage (between 0.8 V and 0.3 V at 0.01 Hz, 50/50 duration) can be applied to achieve the desired loading.

The loading of the conductive polymer can be estimated by the charge passed through the deposition cell after calibrating deposition efficiency (pass a known amount of current or charge through the system and then rinse and dry the sample to measure the weight gain). For example, in the polyaniline camphor sulfonic acid system, 0.57 coulombs corresponds to about 2 mg polyaniline doped with camphor sulfonic acid. The reaction can be stopped when the desired loading is achieved based the charge recorded by the Potentiostat.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for making a hydrophilic wicking fuel cell diffusion medium comprising:
   exposing a carbon fiber substrate to a solution comprising a monomer and an electrolyte, wherein the concentration of monomer is from about 0.5 M to about 1.5 M and the concentration of electrolyte is from about 0.01 M to about 1.5 M; and
   electropolymerizing the monomer to form an electroconductive polymer on the carbon fiber substrate, wherein electropolymerizing includes:
      providing the carbon fiber substrate as the anode of an electrochemical circuit including a counter-electrode;
      applying a positive potential to the anode using a pulse voltage, the pulse voltage including a square wave function having a frequency from about 0.1 Hz to about 0.001 Hz, wherein the anode is at a voltage above the oxidation potential of the monomer;
      thereby oxidizing the monomer to form the electroconductive polymer on the carbon fiber substrate surface.

2. A method according to claim 1, wherein the carbon fiber substrate has a density from about 0.4 g/cm$^3$ to about 0.6 g/cm$^3$.

3. A method according to claim 1, wherein the carbon fiber substrate has a thickness from about 100 to about 1000 micrometers.

4. A method according to claim 1, wherein the carbon fiber substrate has a porosity from about 70% to about 80%.

5. A method according to claim 1, wherein the monomer is selected from the group consisting of pyrrole, thiophene, aniline, furan, azulene, carbazole, substituted derivatives thereof, and combinations thereof.

6. A method according to claim 1, wherein the monomer is selected from the group consisting of β-alkyl thiophene, β-bromo thiophene, β-CH$_2$CN thiophene, β, β-dibromothiophene, and combinations thereof.

7. A method according to claim 1 wherein the electrolyte is selected from the group consisting of camphor sulfonic acid, para-toluene sulfonic acid, dodecyl benzene sulfonic acid, sulfuric acid, alizarin red S-monohydrate, salts thereof, and combinations thereof.

8. A method according to claim 1, wherein the hydrophilic wicking material produced has a surface free energy of more than 80 dyne/cm.

9. A method according to claim 1, wherein the applying step includes a voltage from about 0.5 V to about 2.5 V.

10. A method according to claim 1, wherein applying a positive potential to the anode using a pulse voltage further comprises a percent on/off time of 50/50.

11. A method according to claim 1, wherein the electropolymerizing step results in the carbon fiber substrate coated with from about 5% to about 30% by weight of the electroconductive polymer.

12. A method according to claim 1, wherein the electropolymerizing step results in the electroconductive polymer having a thickness from about 5% to about 10% of the diameter of the carbon fibers.

13. A method for making a hydrophilic wicking fuel cell diffusion medium, comprising
    exposing a carbon fiber substrate to a solution comprising aniline and camphor sulfonic acid electrolyte; and
    electropolymerizing the aniline to form polyaniline on the carbon fiber substrate, wherein electropolymerizing includes:
        providing the carbon fiber substrate as the anode of an electrochemical circuit including a standard calomel reference electrode;
        applying a positive potential to the anode comprising a square wave of applied voltage from 0.3 V to 0.8 V;
        thereby oxidizing the aniline to form polyaniline on the carbon fiber substrate surface.

\* \* \* \* \*